(12) United States Patent
Rao et al.

(10) Patent No.: US 6,851,010 B1
(45) Date of Patent: Feb. 1, 2005

(54) CACHE MANAGEMENT INSTRUCTIONS

(75) Inventors: Lakshmi Rao, Sunnyvale, CA (US); Sunny C. Huang, Saratoga, CA (US); Rudolf H. J. Bloks, Sunnyvale, CA (US); Kornelis A. Vissers, Sunnyvale, CA (US); Frans W. Sijstermans, Los Altos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 436 days.

(21) Appl. No.: 09/895,581

(22) Filed: Jun. 29, 2001

(51) Int. Cl.[7] .............................................. G06F 12/08
(52) U.S. Cl. .......................................... 711/3; 711/118
(58) Field of Search ............................ 711/3, 118, 123, 711/125, 126, 133, 134; 712/200, 211

(56) References Cited

U.S. PATENT DOCUMENTS 4,135,240 A * 1/1979 Ritchie ....................... 711/164
6,076,154 A 6/2000 Van Eijndhoven et al. ... 712/24
6,134,633 A 10/2000 Jacobs ......................... 711/137
6,226,715 B1 5/2001 Van Der Wolf et al. .... 711/133

* cited by examiner

Primary Examiner—Gary Portka
(74) Attorney, Agent, or Firm—Kevin Simons

(57) ABSTRACT

The invention is directed to techniques for managing a cache within a processor using one or more machine instructions. The machine instructions may perform one or more operations on the cache. For example, victimize instructions, allocate instructions, and pre-fetch instructions can be executed in the processor as part of cache management. Moreover, these various cache management instructions may be defined by one or more operands that specify memory addresses within main memory, rather than addresses or identifiers that define locations within the cache. For this reason, a programmer may invoke these cache management instructions to direct the management of the cache without knowing the specific location of data within the cache.

33 Claims, 9 Drawing Sheets

CACHE MANAGEMENT INSTRUCTIONS

FIELD

The invention relates to programmable processors and, more particularly, to managing cache memories.

BACKGROUND

In the context of computer architectures, a cache is a high-speed memory device providing an intermediate level of memory between a processor and main memory. The cache can accelerate processing by storing recently used data or instructions, thereby reducing accesses to main memory that often require significant access times. The cache may be located within the processor or may be external, possibly incorporated into a memory controller.

The operation of a cache is typically transparent to software applications executed by the processor. A cache controller typically manages the cache. The cache controller, for example, updates the cache when a "cache miss" occurs, i.e., when the processor requests data that is not currently stored within the cache. Cache misses, however, can introduce significant processing overhead that impede processor performance. For this reason, it is highly desirable to improve cache management so as to avoid cache misses, and to ensure that the data needed by the processor during processing is available in the cache.

SUMMARY

In general, the invention is directed to techniques for managing a cache within a processor. As described in detail below, one or more machine instructions can be used to improve cache management. The machine instructions may perform one or more operations on the cache. For example, victimize instructions, allocate instructions, and pre-fetch instructions can be executed in the processor as part of cache management. Moreover, the cache management instructions may include one or more operands that specify blocks of memory addresses within main memory, rather than addresses or identifiers that define locations within the cache.

This instruction format is very useful, for example, in multi-media data streaming applications in which the data format is known to a programmer or compiler. The programmer may invoke cache management instructions to direct the management of the cache without knowing the specific location of data within the cache. In this manner, processor performance can be improved by providing software-level control of the cache. In addition, a compiler may generate one or more cache management instructions based on data types and data access analysis for a software program.

As mentioned, the operands of cache management instructions may specify one or more addresses within main memory. In one exemplary embodiment, for example, the operands specify a starting address, a stride value, and a count. Data located within the cache in data blocks, such as cache lines, words, or bytes that are associated with memory addresses specified by the operands, can be selected and possibly manipulated by cache management machine instructions. The mapping between data blocks and memory addresses, however, may be completely transparent to a programmer invoking the instructions.

Additional details of various embodiments are set forth in the accompanying drawings and the description below. Other features, objects and advantages will become apparent from the description and drawings, and from the claims.

DETAILED DESCRIPTION

Figure 1:
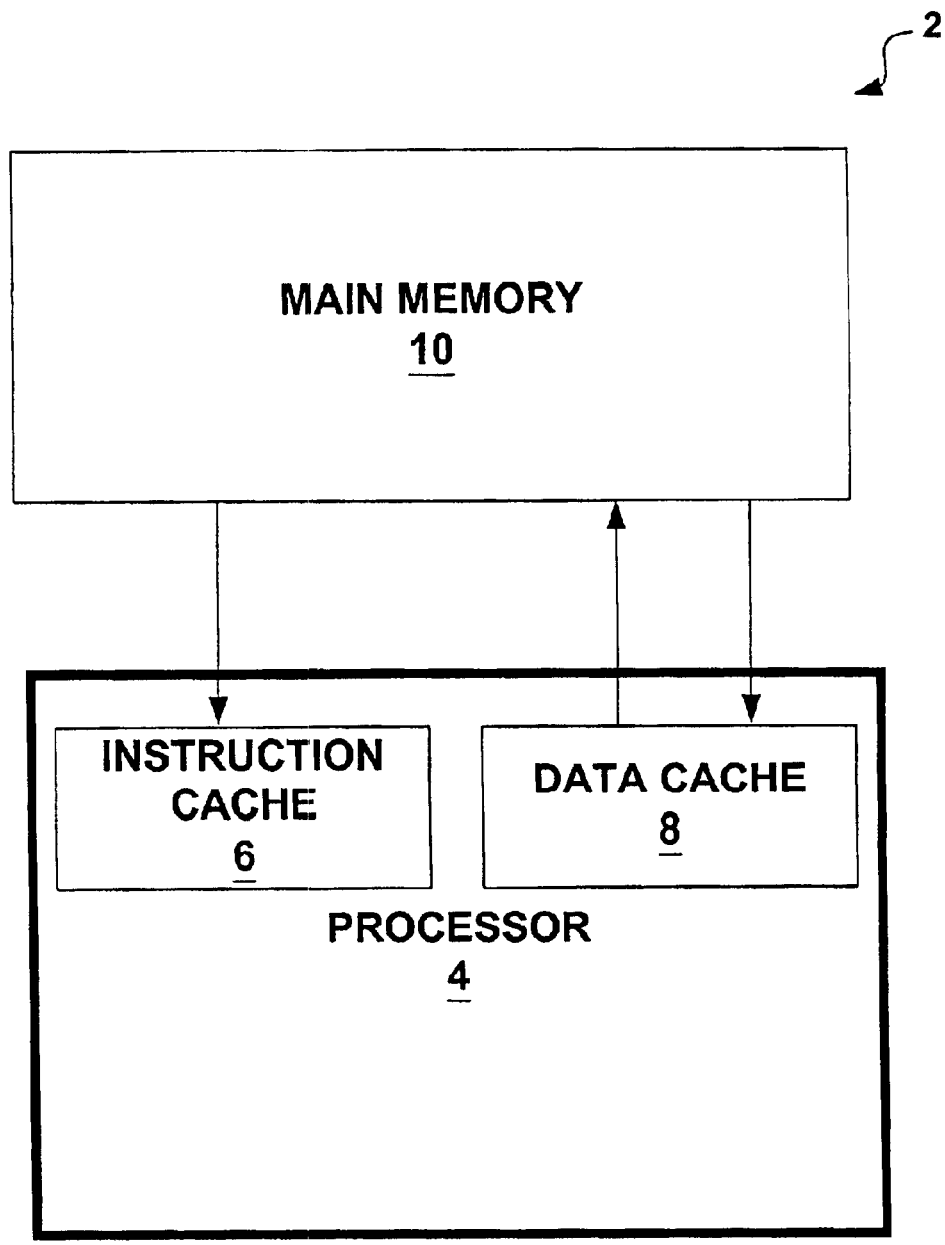
FIG. 1 is a block diagram of a system including a programmable processor and main memory according to the invention.

FIG. 1 is a block diagram illustrating a system 2 including a programmable processor 4 coupled to a main memory 10. Processor 4 includes instruction cache 6 and data cache 8 that are high-speed memory devices for storing instructions and data, respectively, retrieved from main memory 10 by processor 4. Processor 4 executes an instruction stream that contains instructions retrieved from instruction cache 6 or, upon a cache miss, main memory 10. While processing the instructions, processor 4 may load data from main memory 10 and store data to data cache 8. As data is retrieved from main memory 10, data cache 8 overwrites cached data according to a replacement policy. Although illustrated as internal cache memories, instruction cache 6 and data cache 8 may be external to processor 4. In addition, although illustrated as separate and discrete components, instruction cache 6 and data cache 8 may comprise a single unified cache memory that performs the function of both instruction cache 6 and data cache 8.

Programmable processor 4 supports a set of instructions including one or more cache management instructions that specify one or more addresses within main memory 10. System 2 may implement, for example, "victimize" instructions, "allocate" instructions, "prefetch" instructions, and the like, to improve cache management within processor 4. The victimize instructions provide software-level control of the data replacement within data cache 8. The allocate instructions provide software-level control of data block allocation without fetching corresponding data from main memory. The pre-fetch instructions provide software-level control of data transfer from main memory 10 to data cache 8.

Importantly, these cache management instructions include operands that specify a block of memory addresses within main memory 10. For this reason, programmers invoking the instructions need not have knowledge of the mapping between data within data cache 8 and data within main memory 10. In other words, the mapping between data in the data cache 8 and the data in main memory 10 can be made completely transparent to the programmer. This is advantageous because mappings between data blocks in the data cache 8 and data in main memory 10 can change over time as data is moved in and out of data cache 8. Although the techniques described herein can be applied to caches generally, including instruction caches and other caches, many details of the invention are described in the context of data cache 8.

The cache management instructions may improve processor performance without limitation to a particular processor type. Processor 4 may be, for example, a reduced instruction set computing (RISC) processor, a complex instruction set computing (CISC) processor, or variations of conventional RISC processors or CISC processors. Furthermore, processor 4 may be implemented in any number of different architectures including a pipelined architecture, a super-scalar architecture and a very long instruction word (VLIW) architecture having a number of instruction slots.

Main memory 10 may be any computer storage medium including, for example, volatile and nonvolatile, removable and non-removable media for storage of information such as processor-readable instructions, data structures, program modules, or other data. Main memory 10, for example, may comprise random access memory (RAM), read-only memory (ROM), electrically erasable programmable read only memory (EEPROM), flash memory, CD-ROM, digital versatile discs (DVD) or other optical storage, magnetic cassettes, magnetic tape, magnetic disk storage or other magnetic storage devices, or any other medium that can be used to store the desired information and that can be accessed by the processor 4. In other embodiments, main memory 10 may be hierarchical, including a number of cache levels. In that case, the invention may operate on one or more of the cache levels within main memory 10 in addition to data cache 8 as described below.

Figure 2:
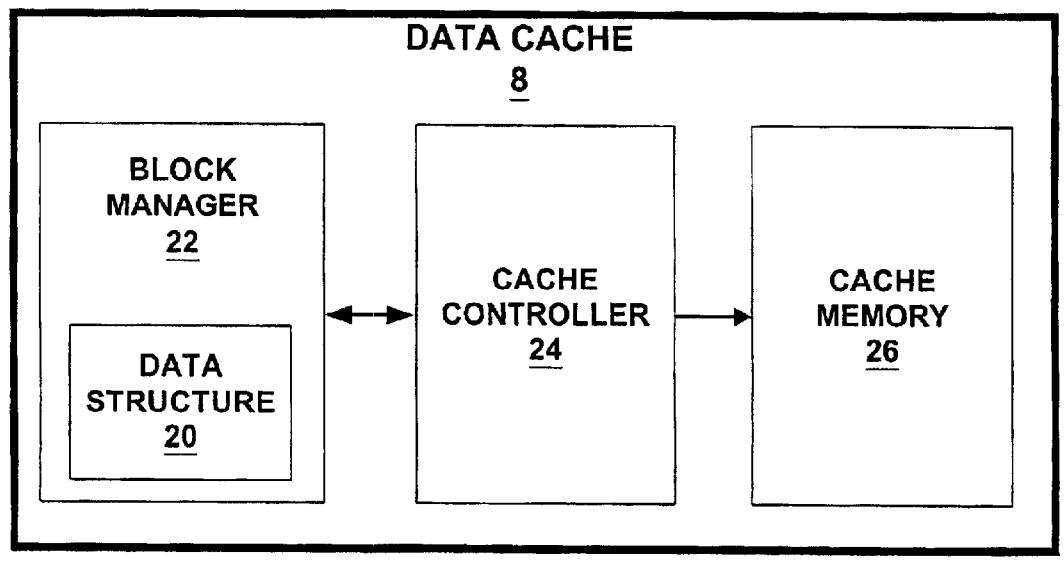
FIG. 2 is a block diagram of a data cache according to the invention.

FIG. 2 is a block diagram illustrating an example embodiment of data cache 8. Cache controller 24 manages cache memory 26, including updating cache memory 26 as processor 4 (FIG. 1) retrieves data from main memory 10. Cache controller 24 overwrites cached data with the new data according to a cache replacement policy. Two common cache replacement policies are least recently used (LRU) cache replacement policy and random cache replacement policy. In a random cache replacement policy, cached data is randomly selected for replacement. In an LRU cache replacement policy, cached data is selected for removal when it has been unused for the longest time.

In some embodiments, cache controller 24 maintains cache administration information necessary for administering cache memory 26, including, for example, an ordered list of recently used data blocks within the cache memory, as well as translation information for mapping between memory addresses and data blocks within the cache. For example, the administration information may include a translation table for translating memory addresses to particular cache lines within the cache. As data is moved in and out of the cache, cache controller 24 may update the translation table. In addition, cache controller 24 may implement the cache replacement policy to overwrite cached data with newly received data.

Block manager 22 cooperates with cache controller 24 to provide software-level control of cache 8. In particular, processor 4 may invoke block manager 22 in response to a cache management instruction, and communicate the operands of the cache management instruction to block manager 22. Block manager 22 may store one or more operands of the cache management instruction in a data structure 20, such as cache management queue or table. The operands of the instruction specify one or more addresses within main memory. For example, the operands of the instruction may specify a starting address, a stride value, and a count. Again, this format provides a programmer with a useful and comprehendible interface to the data stored in the cache at any given time.

By way of example, the cache management instruction may be a pre-fetch instruction, an allocate instruction or a victimize instruction. These respective instructions are described in greater detail below. Briefly, an allocate instruction allows for software-level control of data block allocation within the cache without fetching corresponding data from main memory 10. A pre-fetch instruction allows software-level control of data transfer from main memory 10 to data cache 8. A victimize instruction allows software-level control of the data replacement within data cache 8. For example, a victimize instruction may be used to preempt the cache replacement policy by selecting particular cached data for replacement notwithstanding the cache replacement policy.

Figure 3:
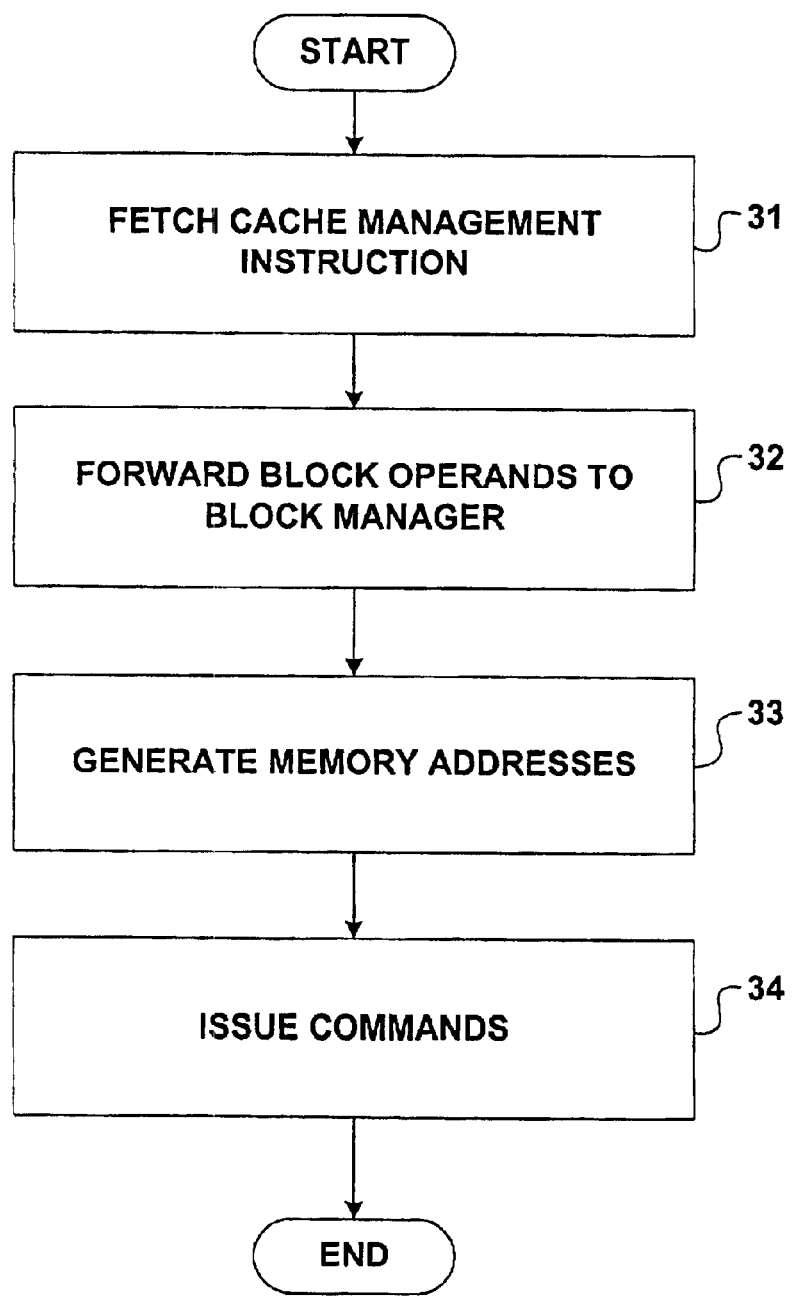
FIG. 3 is a flow diagram illustrating an example mode of operation involving the processing of a cache management instruction.

FIG. 3 is a flow diagram illustrating a mode of operation involving the processing of a cache management instruction within processor 4. As shown, upon fetching a cache management instruction (31), processor 4 forwards the block operands to the block manager 22 (32). The block operands may specify one or more addresses within main memory 10. Based on the operands, block manager 22 generates one or more corresponding memory address (33) and issues a "command" to perform the desired operation (34). The content and destination of the command may depend on the particular cache management instruction that was executed. For example, a victimize instruction may cause block manager 22 to issue one or more victimize commands to cache controller 24, while a pre-fetch instruction may cause block manager 22 to issue one or more fetch commands to main memory 10. An allocate instruction may cause block manager 22 to issue one or more allocate commands to cache controller 24. Regardless of the destination, the one or more commands include the addresses that block manager 22 generated from the block operands. The receiving unit, whether it be cache controller 24 or main memory 10, carries out the commands based on the designated memory addresses. In this manner, the programmer need only specify blocks of memory addresses, which block manager 22 automatically translates into specific memory addresses and issues to the appropriate destination.

The following expression illustrates an exemplary assembly language syntax for invoking a cache management machine instruction in the form of an allocate instruction:

ALLOCATE (START_ADDRESS, STRIDE, COUNT)

The allocate instruction allows for software-level control of data block allocation, e.g., cache line, word or byte allocation, without fetching corresponding data from main memory. For instance, the allocate instruction can be used to indicate that data is present in the cache, when in fact, the data is not in the cache. The allocate instruction may be invoked to prevent an unnecessary data fetch from memory when it is known that the entire data block will be overwritten. The other machine instructions may have a similar format.

Figure 4:
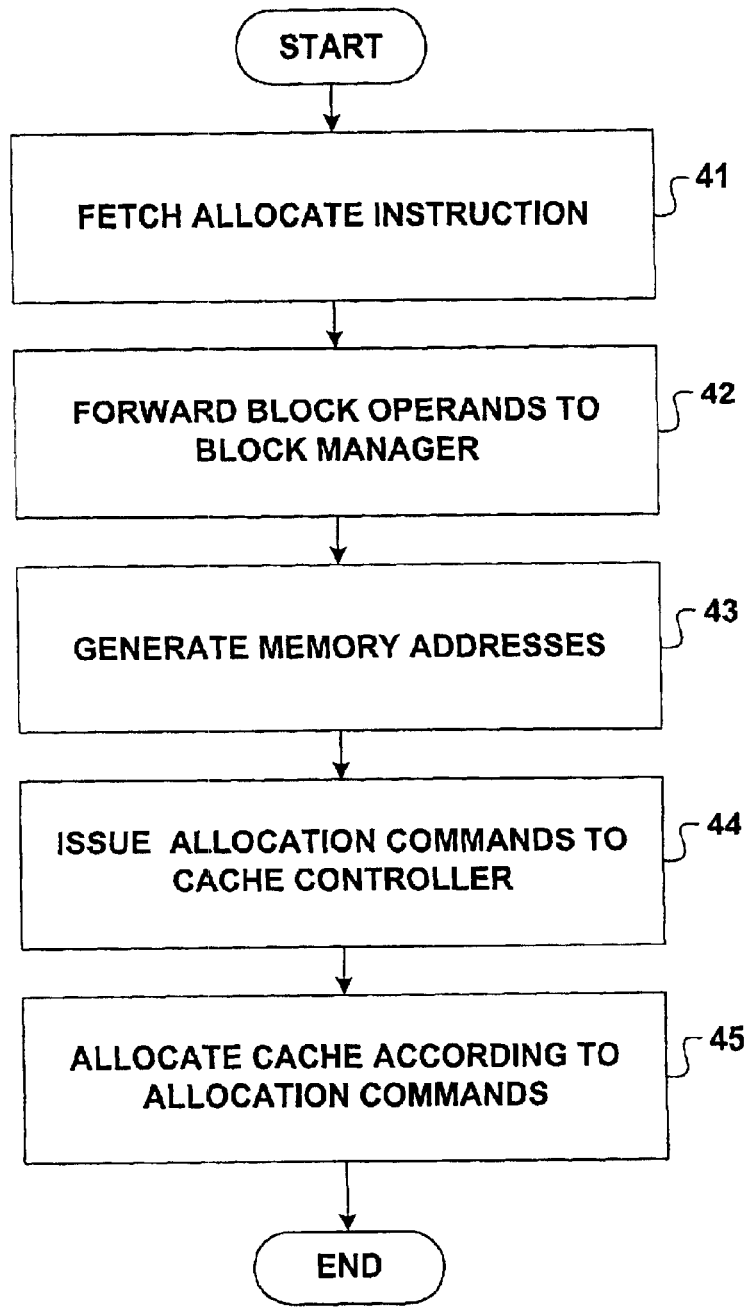
FIG. 4 is a flow diagram illustrating an example mode of operation involving the processing of a cache management instruction in the form of an allocate instruction.

FIG. 4 is a flow diagram illustrating in further detail, a mode of operation of processor 4 when executing a cache management instruction in the form of an allocate instruction within processor 4. As shown, upon fetching an allocate instruction (41), processor 4 forwards the block operands to block manager (42). The block operands may specify one or more addresses within main memory. Block manager 22 generates one or more allocation commands (43), and issues the corresponding commands to cache controller 24 (44). For example, if the operands include a starting address (SA), a stride value (SV), and a count (C), block manager 22 generates one or more commands that includes a set of allocate addresses, where an address A can be calculated as A=SA+SV*n, where n∈[0,C−1]. In response, cache controller 24 allocates data within the cache according to the received allocation commands (45). For example, one or more of the least recently used (LRU) cache lines may be allocated to correspond to the generated memory addresses. In this manner, software applications can utilize the allocate machine instruction to improve processor performance in certain situations to prevent unnecessary data fetches from memory.

Similarly, the following expression illustrates an exemplary assembly language syntax for invoking a cache management machine instruction in the form of pre-fetch instruction:

PRE-FETCH (START_ADDRESS, STRIDE, COUNT)

The pre-fetch instruction allows for software-level control of pre-fetches from main memory 10. The purpose of data pre-fetching is to transfer data from main memory 10 to data cache 8 before processor 4 uses the data. By pre-fetching data, cache misses can be avoided, thereby avoiding stalling within processor 4.

Figure 5:
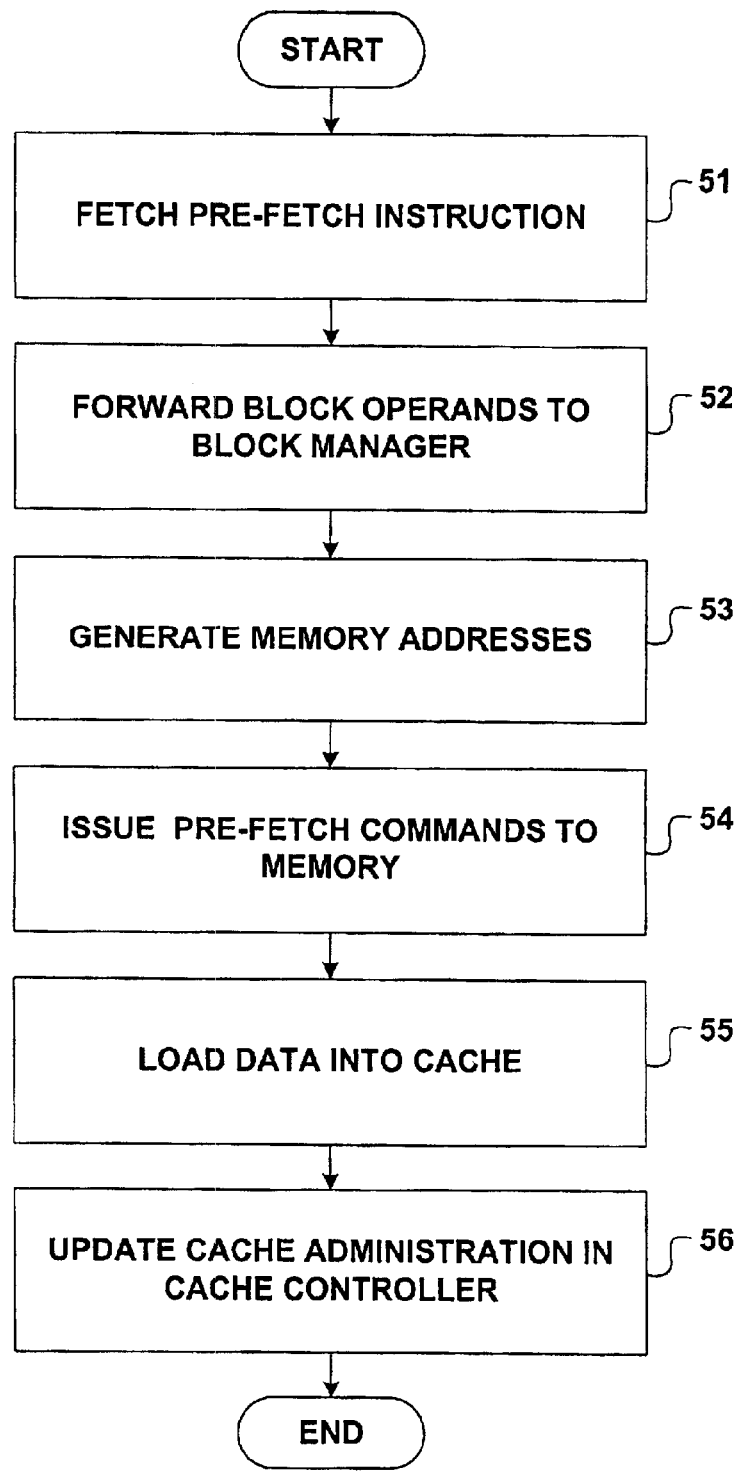
FIG. 5 is a flow diagram illustrating an example mode of operation involving the processing of a cache management instruction in the form of a pre-fetch instruction.

FIG. 5 is a flow diagram illustrating a mode of operation of processor 4 when executing a cache management instruction in the form of a pre-fetch instruction. As shown, upon fetching a pre-fetch instruction (51), block operands are forwarded to block manager 22 (52). The block operands may specify one or more addresses within main memory. Block manager 22 generates one or more pre-fetch commands (53), and issues the one or more commands (54) to main memory 10. For example, if the operands include a starting address (SA), a stride value (SV), and a count (C), block manager 22 generates one or more commands that includes a set of pre-fetch addresses, where an address A can be calculated as A=SA+SV*n, where n∈[0,C−1]. Data is then loaded into cache 8 according to the pre-fetch commands (55). In addition, cache controller updates cache administration information stored within cache controller 22 to reflect the fact that new data has been loaded into cache 8 (56). In this manner, software applications can utilize the pre-fetch machine instruction to improve processor performance by ensuring that the data needed by processor 4 during processing is available in cache 8.

The following expression illustrates an exemplary assembly language syntax for invoking a cache management machine instruction in the form of victimize instruction:

VICTIMIZE (START_ADDRESS, STRIDE, COUNT)

The victimize instruction allows for software-level control of the cache replacement policy. For example, the victimize instruction may select data which will be removed from the cache 8 prior to other data specified by the default cache replacement policy. Thus, the victimize instruction can be used to preempt the cache replacement policy of cache 8. As a result, the other data which is potentially more useful to processor 4 than the data selected by the victimize instruction can remain in cache 8. In this manner, software applications can utilize the victimize machine instruction to improve processor performance in certain situations where the default cache replacement policy, such as LRU, does not result in optimal performance. For example, multimedia applications that process large sets of data can utilize the instruction to mark for removal recently used data that is not likely to be, quickly reused. Co-pending and commonly assigned U.S. application Ser. No. 09/895,368 to Kornelius A. Vissers et al., entitled "CONTROLLING A REPLACEMENT POLICY OF A CACHE," filed Jun. 29, 2001, and describes various embodiments of the victimize instruction in greater detail. The content of the above-referenced patent application is incorporated herein by reference in its entirety.

Figure 6:
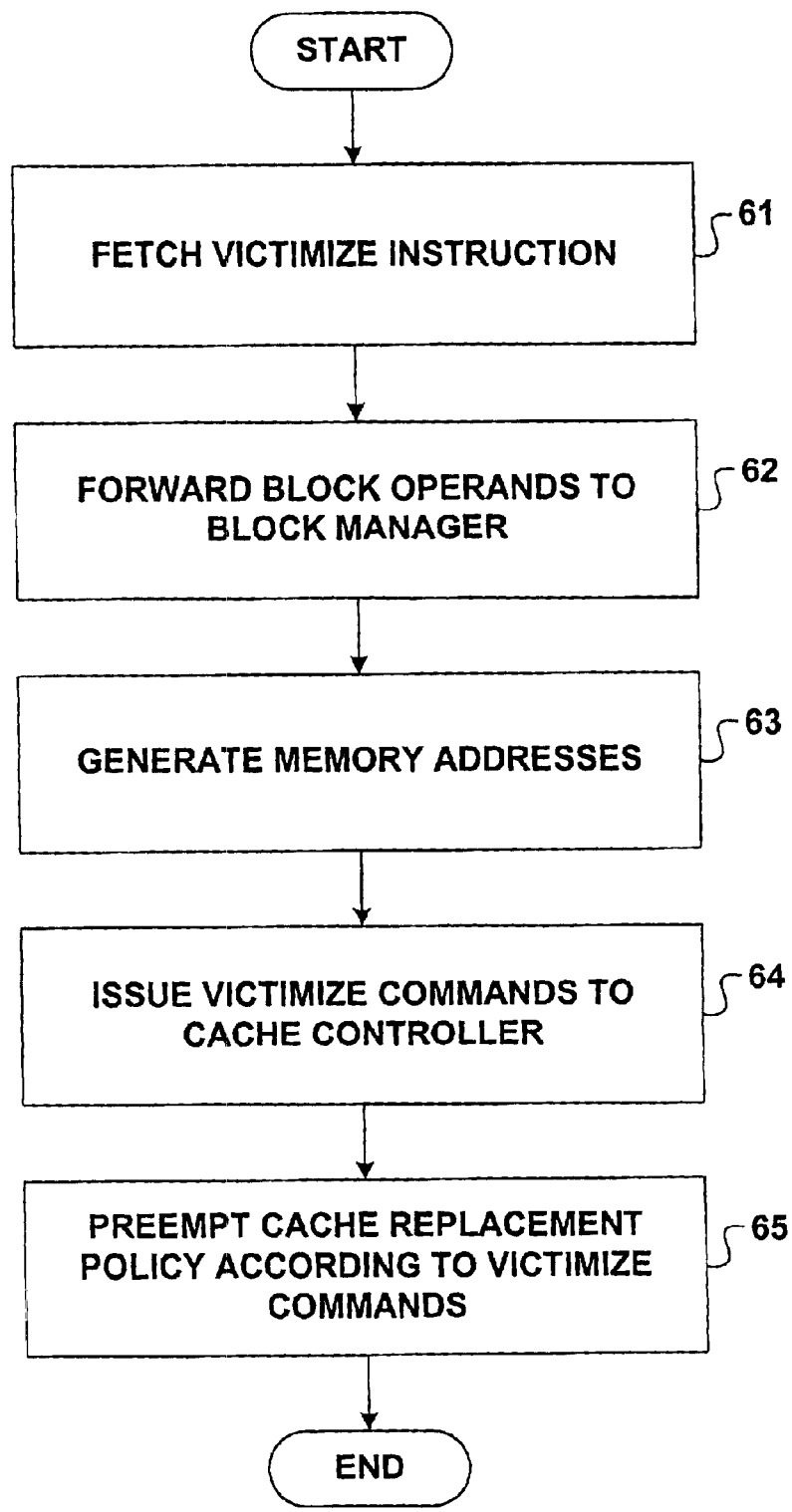
FIG. 6 is a flow diagram illustrating an example mode of operation involving the processing of a cache management instruction in the form of a victimize instruction.

FIG. 6 is a flow diagram illustrating a mode of operation of processor 4 when executing a cache management instruction in the form of a victimize instruction. As shown, upon fetching a victimize instruction (61), block operands are forwarded to block manager 22 (62). The block operands may specify one or more addresses within main memory. Block manager 22 generates one or more victimize commands (63), and issues the one or more commands (64) to cache controller 24. Again, for example, if the operands include a starting address (SA), a stride value (SV), and a count (C), block manager 22 generates one or more commands that include a set of victimized addresses, where an address A can be calculated as A=SA+SV*n, where n∈[0, C−1]. Cache controller 24 uses the victimize commands to preempt the default cache replacement policy (64). In this manner, software applications can utilize the victimize machine instruction to improve processor performance by ensuring that the data is removed from cache in a more useful manner than the default cache replacement policy.

In one embodiment block manager 22 issues the victim commands to cache controller 24 (64), which coordinates the victimized addresses with the existing replacement policy, such as by tagging for removal any stored data associated with one of the victimized addresses. In this embodiment, cache controller 22 may implement the LRU replacement policy. For example, cache controller 22 may maintain a list, identifying an order for replacing cached data blocks based on how recently the data blocks had been requested. Upon receiving a command from block manager 22 that includes one or more victim addresses, cache controller 24 may move the corresponding data to the top of the list, thereby accelerating its replacement (65). Upon detecting a cache miss, cache controller 24 overwrites data blocks at the top of the list according to the LRU policy. In this manner, the preemptive victimize commands can be made transparent to the LRU policy which simply removes data from the top of the list. Alternatively, in another embodiment cache controller 24 may directly access victimized information stored within block manager data structure 20. The data structure may be a table, a queue or any other suitable data structure.

Figure 7:
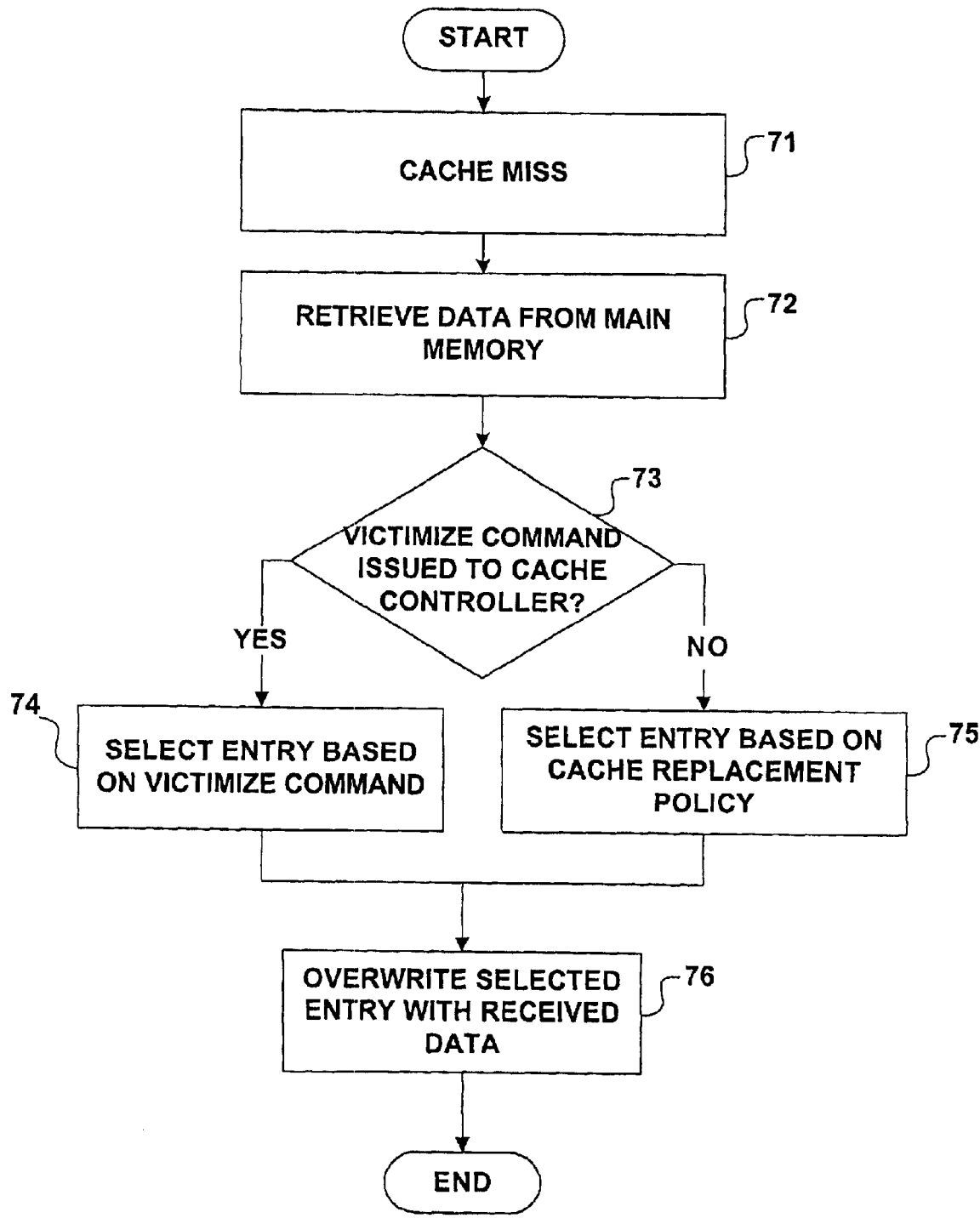
FIG. 7 is a flow diagram illustrating an example mode of operation of a processor in which a cache controller removes selected data from the cache after receiving a victimize command.

FIG. 7 is a flow diagram illustrating an example mode of operation of processor 4 in which cache controller 24 removes selected data from the cache after receiving a victimize command. As shown, when processor 4 requests data that is not stored within data cache 8 (71), cache controller 24 retrieves the requested data from main memory 10 (72). Cache controller 24 then selects data for removal from the cache 8 based upon whether a victimize command was issued to the cache controller 24 (73). If so (yes branch of 73), then cache controller 24 may select the cache lines (or other data blocks depending on the format of the cache implementation) corresponding to the victim addresses specified by the victimize command (74). However, if a victimize command was not issued to the cache controller 24 (no branch of 73), then cache controller 24 may select cache lines according to the default cache replacement policy (75). The selected cache lines can then be overwritten with the retrieved data (76).

When data is replaced within data cache 8, the replaced data may need to be re-written to main memory 10. In particular, if the write policy of the data cache is a write back policy (also called copy back or store in), data blocks within the data cache 8 are written back to main memory 10 when that data is replaced. In that case, write back occurs regardless of how the data block was selected for replacement. Alternatively, data cache 8 may implement a write through policy (also called store through), in which writes to data cache 8 are also made to main memory 10 at the time of the write. In that case, data is not re-written to main memory 10 when the data is replaced.

In some embodiments, the cache management instructions according to the invention may operate on varying levels of memory hierarchy, i.e. cache levels. In those cases, each instruction may specify the cache level within the memory to which it applies. In addition, the instruction would specify the start address, stride and count values as described above. Some example formats are as follows:

ALLOCATE (START_ADDRESS, STRIDE, COUNT, LEVEL)
ALLOCATE LEVEL_X (START_ADDRESS, STRIDE, COUNT)
PRE-FETCH (START_ADDRESS, STRIDE, COUNT, LEVEL)
PRE-FETCH_LEVEL_X (START_ADDRESS, STRIDE, COUNT)
VICTIMIZE (START_ADDRESS, STRIDE, COUNT, LEVEL)
VICTIMIZE_LEVEL_X (START_ADDRESS, STRIDE, COUNT)

Figure 8:
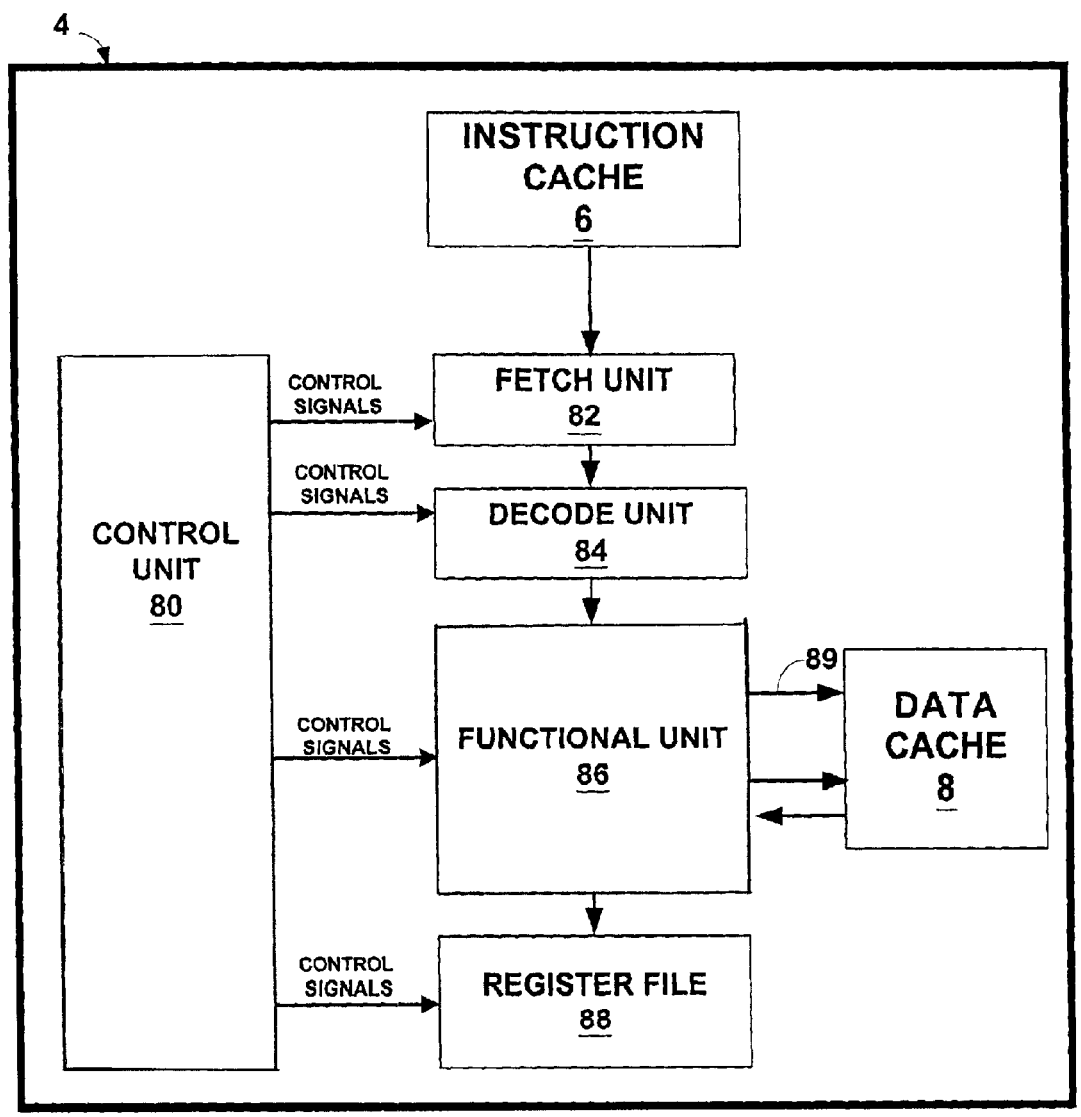
FIG. 8 is a block diagram illustrating an example processor that supports one or more cache management machine instructions for managing a cache.

FIG. 8 is a block diagram illustrating an example processor 4 that supports a cache management machine instruction for managing cache 8. Control unit 80 directs the flow of instructions through processor 4 by controlling various components of processor 4 including fetch unit 82, decode unit 84, functional unit 86 and register file 88. Under the direction of control unit 80, fetch unit 82 sequentially fetches one or more instructions, such as one of the cache management instructions from instruction cache 4 or, upon a cache miss, from main memory 10 (not shown). Decode unit 84 parses the instructions, identifies the opcodes and operands for the instructions and forwards the instructions to functional unit 86 for execution. Decode unit 84 may also decompress and decrypt the instructions depending on the format of instructions while stored in main memory 10.

Functional unit 86 may support a variety of operations including, for example, add, multiply, shift, load, and store. For most instructions, function unit 68 accesses data cache 8 or register file 18 to retrieve or store data. Functional unit 88 may write the results of the operation in register file 18.

Processor 4 executes a cache management instruction in a similar manner. The instruction is fetched and decoded as any other instruction with the instruction stream. Upon receiving a cache management instruction from decode unit 84, functional unit 88 passes the operands of the instruction to data cache 8 and raises an appropriate signal 89 specifying the cache management instruction as a pre-fetch instruction, an allocate instruction, a victimize instruction, or other cache management instruction. Upon receiving signal 89, data cache 8 latches the operands and manages the cache as described above.

In other embodiments, the cache management instructions can be issued directly to memory, or a cache. In that case, the memory or cache may stall functional unit 88 or may operate complete separately from functional unit 88. For example, the cache management instructions may be issued directly to data cache 8 which processes the instructions, latches the operands and manages the cache as described above. In that case, data cache 8 may maintain hardware for tracking data dependencies.

The cache management machine instructions described herein can be incorporated in any software module executable by processor 4, such as an operating system, executable program, device driver, interrupt service routine, and the like. A programmer may use the cache management instruction in source code for a software module written in, for example, assembly or a high-level language such as C++. The cache management instructions provide a useful interface to the programmer because the operands of the cache management instructions specify memory addresses, such as a block of data, within main memory 10. Indeed the mapping between the memory addresses specified by the operands and the data in the cache can be completely transparent to the programmer.

In one embodiment the cache management instruction is included as a function or macro, often referred to as an intrinsic function, within a software library provided for a corresponding processor. In this manner, the programmer may invoke the cache management instruction by including an appropriate file, such as a header file, from the library and inserting a specific function call. A compiler generates the cache management machine instruction from the function call or macro when compiling the software module. In one embodiment, the function call may take three operands: the first operand representing the starting address, the second operand representing the stride, and the third operand representing the count. In another embodiment, the function call may receive a pointer to a data block of a certain data type, and based upon the data type, the compiler may generate the appropriate parameters and address space to perform the cache management task. In this embodiment the generated instructions are typically configured to receive program counter relative addressing.

In another embodiment, cache management instructions are automatically inserted into a software module by the compiler during compilation. The compiler may perform analysis on the high-level source code to identify the need for a cache management instruction having block operations, such as an allocate, victimize or pre-fetch operation described above.

Figure 9:
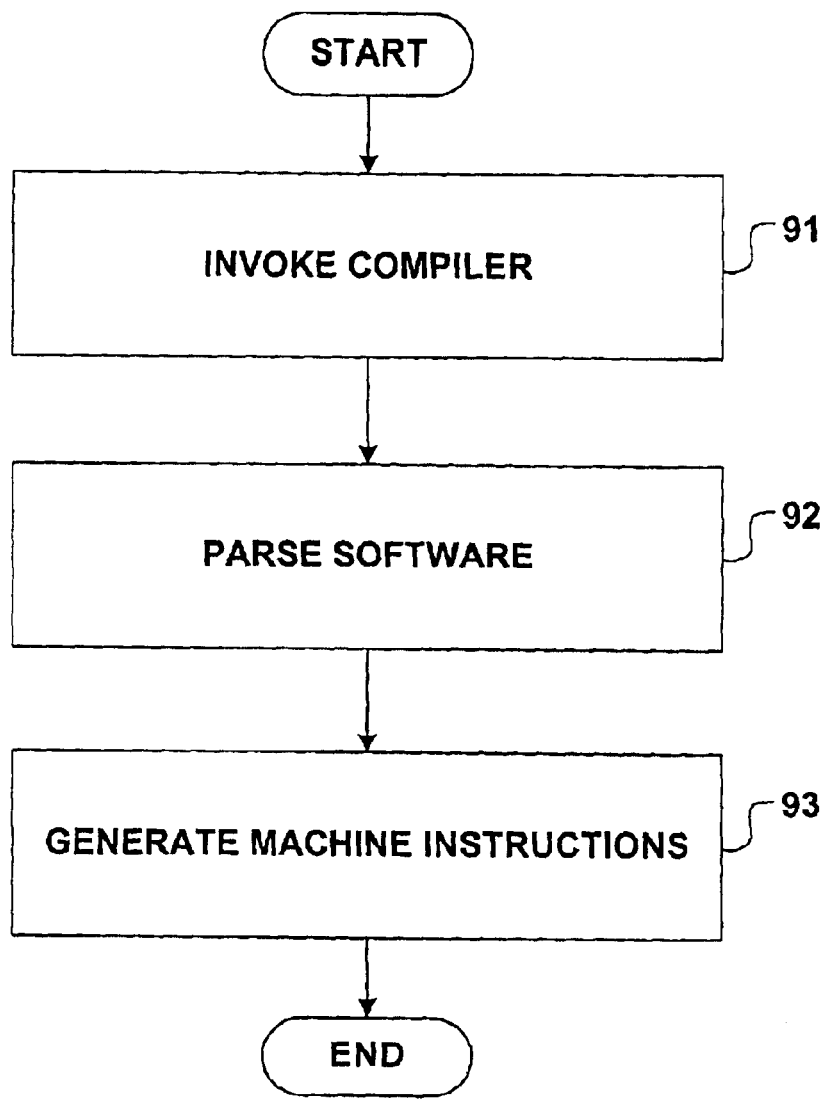
FIG. 9 is a flow diagram illustrating the process of compiling a software module to produce instructions according to the invention.

FIG. 9 is a flow diagram illustrating the process of compiling a software module to produce instructions according to the invention. Once the compiler is invoked (91), the compiler parses the software module (92), e.g., source code, and generates one or more machine instructions (93). The machine instructions generated by the compiler cause a processor to carry out the operations specified in the software program. In accordance with the invention, the compiler may generate a cache management instruction for managing cache 8.

A number of implementations and embodiments of the invention have been described. For instance, cache management instructions have been described that facilitate cache management within a processor. The operands of the cache management instructions may specify blocks of memory addresses, including one or more addresses within main memory. The processor may be implemented in a variety of systems including general purpose computing systems, digital processing systems, digital televisions, laptop computers, personal digital assistants (PDAs) and cellular phones. In this context the cache management instructions discussed above may be readily used to improve system performance. In such a system, the processor may be coupled to a memory device, such as FLASH memory, static random access memory (SRAM), or dynamic random access memory (DRAM) that stores an operating system and/or other software applications.

Nevertheless, it is understood that various modifications may be made without departing from the spirit and scope of the invention. For example, the cache management instructions may include other instructions in addition to victimize instructions, allocate instructions and pre-fetch instructions. Accordingly, other implementations and embodiments are within the scope of the following claims.

What is claimed is:

1. A method of managing a cache comprising:
    executing a cache management instruction that includes operands specifying one or more addresses within a main memory coupled to the cache, the operands comprising a starting address operand, a stride operand, and a count operand, wherein the cache management instruction is invoked by a software program, and
    managing data blocks within the cache based on the specified memory addresses.

2. The method of claim 1, wherein executing a cache management instruction further comprises generating the memory addresses from the operands.

3. The method of claim 1, wherein the cache management instruction is a pre-fetch instruction, and wherein managing data blocks comprises causing data at the specified addresses in the main memory to be loaded into the cache.

4. The method of claim 1, wherein the cache management instruction is an allocate instruction, and wherein managing data blocks comprises allocating one or more data blocks to the specified memory addresses.

5. The method of claim 1, wherein the data blocks comprise one of cache lines, words, and bytes.

6. A method of compiling a software program comprising generating executable instructions including a cache management instruction having operands specifying one or more addresses within a main memory, the operands comprising a starting address operand, a stride operand and a count operand, wherein the cache management instruction directs management of data blocks within a cache coupled to the main memory based on the specified memory-addresses.

7. The method of claim 6, wherein the cache management instruction is a pre-fetch instruction, and wherein the pre-fetch instruction causes data at the specified memory addresses to be loaded into the cache.

8. The method of claim 6, wherein the cache management instruction is an allocate instruction, and wherein the allocate instruction causes allocation of one or more data blocks to the specified memory addresses.

9. The method of claim 6, wherein the data blocks comprise one of cache lines, words, and bytes.

10. A processor comprising:
    a cache having a plurality of data blocks; and
    a functional unit adapted to execute a cache management instruction having operands specifying one or more addresses in a main memory coupled to the cache, the operands comprising a starting address operand, a stride operand, and a count operand, wherein the cache management instruction directs management of data blocks within the cache based on the specified memory addresses, wherein the cache management instruction is capable of being invoked by a software program.

11. The processor of claim 10, wherein the cache includes a block manager that receives the operands from the functional unit and generates the memory addresses based on the operands.

12. The processor of claim 11, wherein the cache includes a cache controller, and wherein the cache management instruction causes the block manager to issue one or more commands to the cache controller to preempt a cache replacement policy.

13. The processor of claim 11, wherein the cache includes a cache controller, and wherein the cache management instruction causes the block manager to issue one or more commands to the cache controller to allocate one or more data blocks to the generated memory addresses.

14. The processor of claim 11, wherein the cache management instruction causes the block manager to issue one or more commands to the main memory to load data at the generated memory addresses into the cache.

15. The processor of claim 10, wherein the cache includes a table to store the operands.

16. The processor of claim 10, wherein the cache includes a queue to store the operands.

17. The processor of claim 10, wherein the processor is a very long instruction word processor.

18. The processor of claim 10, wherein the cache is a data cache.

19. The processor of claim 10, wherein the cache is an instruction cache.

20. A system including:
    a memory device;
    a cache coupled to the memory device, the cache organized as a plurality of data blocks; and
    a processor coupled to the cache, wherein the processor is adapted to execute a cache management instruction to manage the cache, the cache management instruction having operands that specify one or more addresses within the memory device, the operands comprising a starting address operand, astride operand, and a count operand, wherein the cache management instruction is capable of being invoked by a software program.

21. The system of claim 20, wherein the cache is internal to the processor.

22. The system of claim 20, wherein the cache is external to the processor.

23. The system of claim 20, wherein the cache is a data cache.

24. The system of claim 20, wherein the cache is an instruction cache.

25. The system of claim 20, wherein the data blocks comprise one of cache lines, words, and bytes.

26. The system of claim 20, wherein the cache includes a block manager that receives the operands and generates the memory addresses based on the operands.

27. The system of claim 26, wherein the cache includes a cache controller, and wherein the cache management instruction causes the block manager to issue one or more commands to the cache controller to preempt the cache replacement policy.

28. The system of claim 26, wherein the cache includes a cache controller, and wherein the cache management instruction causes the block manager to issue one or more commands to the cache controller to allocate one or more data blocks to the generated memory addresses.

29. The system of claim 26, wherein the cache management instruction causes the block manager to issue one or more commands to the memory device to load data at the generated memory addresses into the cache.

30. A computer readable medium having executable instructions for a programmable processor stored thereon, wherein the instructions include a cache management instruction that directs the programmable processor to manage data blocks within a cache based on one or more memory addresses in a main memory coupled to the cache, wherein the memory addresses are specified by operands of the cache management instruction, the operands comprising a starting address operand, a stride operand, and a count operand, wherein the cache management instruction is capable of being invoked by a software program.

31. The computer readable medium of claim 30, wherein the data blocks comprise one of cache lines, words and bytes.

32. The computer readable medium of claim 30, wherein the cache management instruction is a pre-fetch instruction, and wherein the pre-fetch instruction causes one or more commands to be issued to the main memory to fetch data at the specified memory addresses.

33. The computer readable medium of claim 30, wherein the cache management instruction is an allocate instruction, and wherein the allocate instruction causes one or more commands to be issued to a cache controller to allocate one or more data blocks to the specified memory addresses.

\* \* \* \* \*